United States Patent [19]

Merry

[11] 4,338,104
[45] Jul. 6, 1982

[54] APPARATUS FOR DUSTING OFF GAS BY FILTRATION AND ASPIRATION CLEANING OF FILTER, AND APPLICATION TO COMBUSTION GASES

[75] Inventor: Jean-Louis Merry, Verneuil-en-Halatte, France

[73] Assignee: Charbonnages de France, France

[21] Appl. No.: 273,836

[22] Filed: Jun. 15, 1981

[30] Foreign Application Priority Data

Jun. 16, 1980 [FR] France ............................... 80 13296

[51] Int. Cl.³ .......................................... B01D 46/04
[52] U.S. Cl. ......................................... 55/291; 55/96; 55/294; 55/296; 55/487; 55/479
[58] Field of Search ........................................ 55/96–99, 55/282, 283, 294, 302, 296, 487, 291, 474, 479; 210/792, 796–798, 272, 275, 276

[56] References Cited

U.S. PATENT DOCUMENTS

| | | | |
|---|---|---|---|
| 2,995,204 | 8/1961 | Prostshakov | 55/474 |
| 3,564,570 | 2/1971 | Lincoln et al. | 55/291 |
| 3,594,991 | 7/1971 | Berz et al. | 55/474 |
| 4,004,350 | 1/1977 | Squires | 55/98 |
| 4,210,427 | 7/1980 | Brett et al. | 55/96 |
| 4,290,785 | 9/1981 | Aldredge | 55/96 |

FOREIGN PATENT DOCUMENTS

| | | | |
|---|---|---|---|
| 738349 | 8/1943 | Fed. Rep. of Germany | 55/294 |
| 135216 | 6/1921 | United Kingdom | 55/99 |
| 453175 | 1/1975 | U.S.S.R. | 55/294 |
| 582812 | 12/1977 | U.S.S.R. | 55/294 |
| 709133 | 1/1980 | U.S.S.R. | 55/96 |

*Primary Examiner*—Bernard Nozick
*Attorney, Agent, or Firm*—Karl W. Flocks

[57] ABSTRACT

Method and apparatus for dusting off gases by filtration and cleaning of filter by aspiration and application thereof to combustion gases.

This invention relates to the filtration of dust loaded gases, in particular, combustion gases in the hot state. It consists of passing gases to be dusted off from top to bottom over a bed of pulverulent material, in particular, a sand bed and cleaning the upper layer of said bed by aspiration of dusts deposited thereon. This invention is particularly adapted for dusting off combustion gases from boilers or thermal power stations or gases to be supplied to gas turbines.

3 Claims, 4 Drawing Figures

APPARATUS FOR DUSTING OFF GAS BY FILTRATION AND ASPIRATION CLEANING OF FILTER, AND APPLICATION TO COMBUSTION GASES

This invention relates to an apparatus for removal of dust from gas by filtration through a bed of pulverulent material.

In the known devices of this type the dust loaded gases generally penetrate laterally a sand bed which is traversed thereby from bottom to top and the sand is regenerated by continuous extraction by gravity. Such devices imply the handling of the entire bed to obtain regeneration thereof; the efficiency of filtration is reduced due to the permanent motion of the grains of sand, and the introduction of gases to be dusted off into the sand bed generally requires the use of metallic grids thereby limiting the maximum temperature of the gas to be treated.

This invention permits to eliminate such disadvantages.

It consists of a method according to which the dust loaded gas stream is passed vertically from top to bottom through a bed of pulverulent filtering material the upper layer of which is cleaned by aspiration of the dust deposited thereon.

The aspiration which may be continuous or not is preferably effected by moving the aspiration means on the upper surface of the bed without interrupting passage of gas to be dusted off through the bed; during such movement the aspiration can be facilitated by stirring up, raking or scraping the upper layer of the bed of pulverulent material which is generally sand or any other similar granular material whether natural or artificial.

The pulverulent material constituting the upper layer of the bed is generally comprised of sand. It may however be formed from any other natural or artificial material generally refractory, having equivalent grading such as alumina, graphite, silicon carbide, ceramic products and the like. In certain cases it may be comprised of grains of dust themselves filtered, thereby to avoid the need for recycling the pulverulent material.

This invention also relates to an apparatus for dusting off gases, in which an aspiration device, preferably of the movable type is provided for removal of dust deposited on the upper layer of the bed of pulverulent filtering material.

This invention will now be described in a purely illustrative and not in any way limitative manner with the help of the attached drawings in which.

Figure 1:
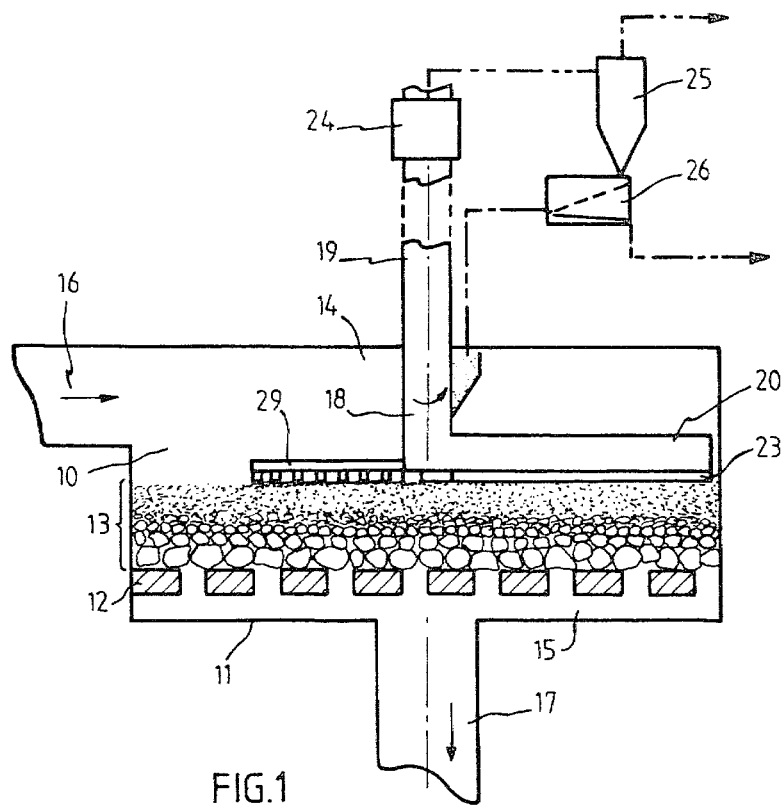
FIG. 1 is a schematical view in vertical cross-section of a form of embodiment.
Figure 2:
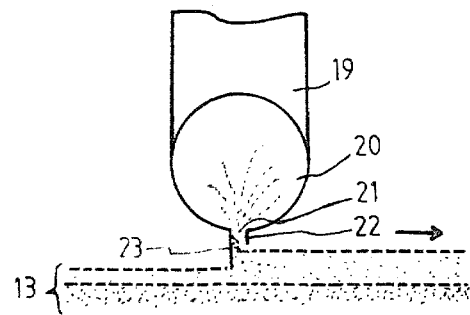
FIG. 2 is a partial view from the right hand side of the device of FIG. 1.
Figure 3:
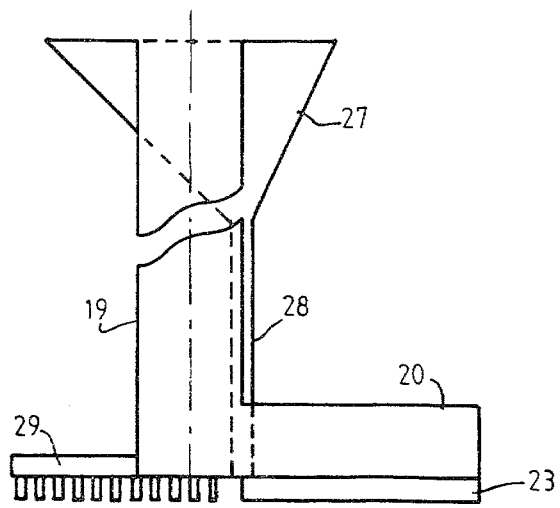
Figure 4:
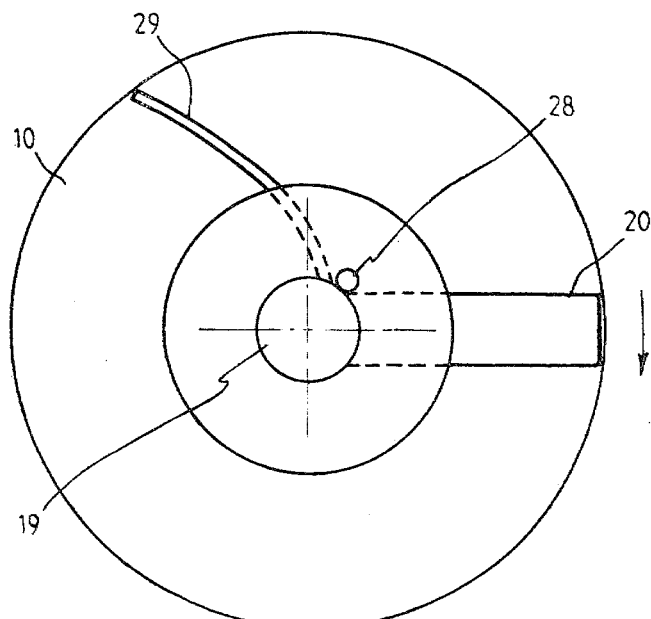

FIGS. 3 and 4 respectively represent vertical and horizontal views of the device for aspirating dusts and returning sand used in FIGS. 1 and 2.

With particular reference to FIG. 1, the apparatus according to the invention comprises a container 10 of cylindrical shape in which a grid 12 of ceramic material is arranged at a distance from the bottom 11.

Said grid 12 is used for supporting the bed 13 of filtering material which comprises a series of layers of pulverulent materials having a diminishing grading from the bottom up.

Thus, provision can be made, for example, to dispose on grid 12 first a layer of gravels the diameter of grains of which is in the order of 10 mm, then a layer of gravels the diameter of grains of which is in the order of 3 mm, and thereafter a layer of crushed sand of the Dieppe type, having a grain diameter of about 1 mm, and finally a layer of sand of the Fontainebleau type having a grain diameter of about 0.2 to 0.3 mm.

The bed of pulverulent material 13 divides the inside of container 10 into an upper chamber 14 into the periphery of which an inlet pipe 16 for gas to be dusted off opens, and into a lower chamber 15 provided with an outlet pipe 17 for purified gas located in line with the axis of the container 10.

The aspiration device comprises an L-shaped conduit denoted 18 in which a suction action can be maintained through a system not shown on the drawing.

The L-shaped conduit 18 comprises a vertical arm 19 in line with the axis of the container 10 and rotatably mounted with sealing means on the container 10 and a horizontal arm 20 extending from the center to the periphery of the latter so as to sweep across the whole surface thereof.

The arm 20 is provided with a slot 21 extending through its length and delimited by two vertical walls of different height and one 22 of which is located downstream with respect to the direction of movement of arm 20 and is made flush with the top of the upper layer of the bed of pulverulent material, while the other 23 located upstream penetrates said layer (see FIG. 2).

The materials sucked into the conduit 18 pass through a heat exchanger 24, then in a cyclone 25 wherein recyclable purified gas is separated as well as solid particles which may be directed to a screening device 26 (FIG. 1).

The screening residue consists of sand which returns through a hopper 27 and a chute 28 to the center of the container 10 where it is spread out by a rake 29 secured to the conduit 18 (FIGS. 3 and 4).

The apparatus according to the invention works in the following way: the gases to be dusted off penetrate through pipe 16 into the upper chamber 14 at a pressure $P_1$ and move out in a purified state after passing through the bed 13 through the pipe 17 where a pressure $P_2$ lower than $P_1$ reigns.

During their passage through the bed of pulverulent material 13 the gases lay down the dusts they are loaded with on the upper layer of said bed.

The aspiration device works either continuously or intermittently when the pressure differential of $P_1$ and $P_2$ reaches a limitative value.

As soon as aspiration is produced by building within conduit 18 a pressure $P_3$ lower than $P_1$ conduit 18 is driven into rotation and the arm 20 moves in the direction shown on FIGS. 2 and 4.

During such movement the wall 23 scrapes the upper layer of sand on which dusts are deposited and such superficial stirring facilitates aspiration thereof into the arm 20.

Dusts are aspirated into the arm 19 and are separated from gasses in the cyclone 25 and thereafter they pass through the screening device 26 in which the driven sand grains are returned to the bed 13, and the dusts can be recovered to be burned off if they are of the combustible type.

Such an apparatus is simple and efficient and makes it possible to clean the filter quickly without recycling the whole of the filtering material and without interrupting the filtration steps.

It is particularly applicable to dusting off hot gas, especially, combustion gases from oil-fired boilers, thermal power stations, ceramic industry, gas producers or from pulverized coal boilers in which the apparatus enables to reduce the dimensions of the fire place by stopping unburned materials and reduce the dimensions of the exchangers; it may be also be applied to the treatment of gas supplied to gas turbines.

I claim:

1. An apparatus for continuously removing dust from dust-loaded hot gases comprising an enclosure, a grid of a refractory material on the bottom of said enclosure, at least one fixed bed of inert coarse granular particles on said grid at a first lower level and at least one bed of inert finer granular particles on said fixed bed of coarse particles at a fixed higher level, a free volume above said two beds and an inlet conduit for the hot gases in said free volume, an outlet conduit for the gases below said grid, a hollow shaft rotatively mounted in said free volume above said bed of finer particles and comprising a vertical arm and at least one substantially horizontal arm arranged to be flush with the upper surface of said bed of finer particles, an opening along said substantially horizontal arm turned to said bed of finer particles, a means for exerting a suction action into said hollow shaft, at least one wall comprising a scrapping means radially mounted with respect to said vertical arm of said hollow shaft and penetrating into the upper surface of said bed of finer particles, at least one raking means radially mounted with respect to said vertical arm and angularly disposed with respect to said scrapping means, a separating means of the dust from the granular particles sucked through said hollow shaft and a means for returning said particles to said bed of finer particles at said fixed higher level.

2. An apparatus according to claim 1 wherein said bed of coarse particles comprises granular particles of a diameter from 10 mm to 3 mm and said bed of finer granular particles comprises particles of a diameter from 1 mm to 0.2 mm.

3. An apparatus according to claim 1 wherein said separating means of the dust from the particles comprises, connected to said hollow shaft, a gas-solid separating cyclone and a separating screen connected to a conduit returning said solid into said finer particles bed.

* * * * *